Patented Aug. 30, 1949

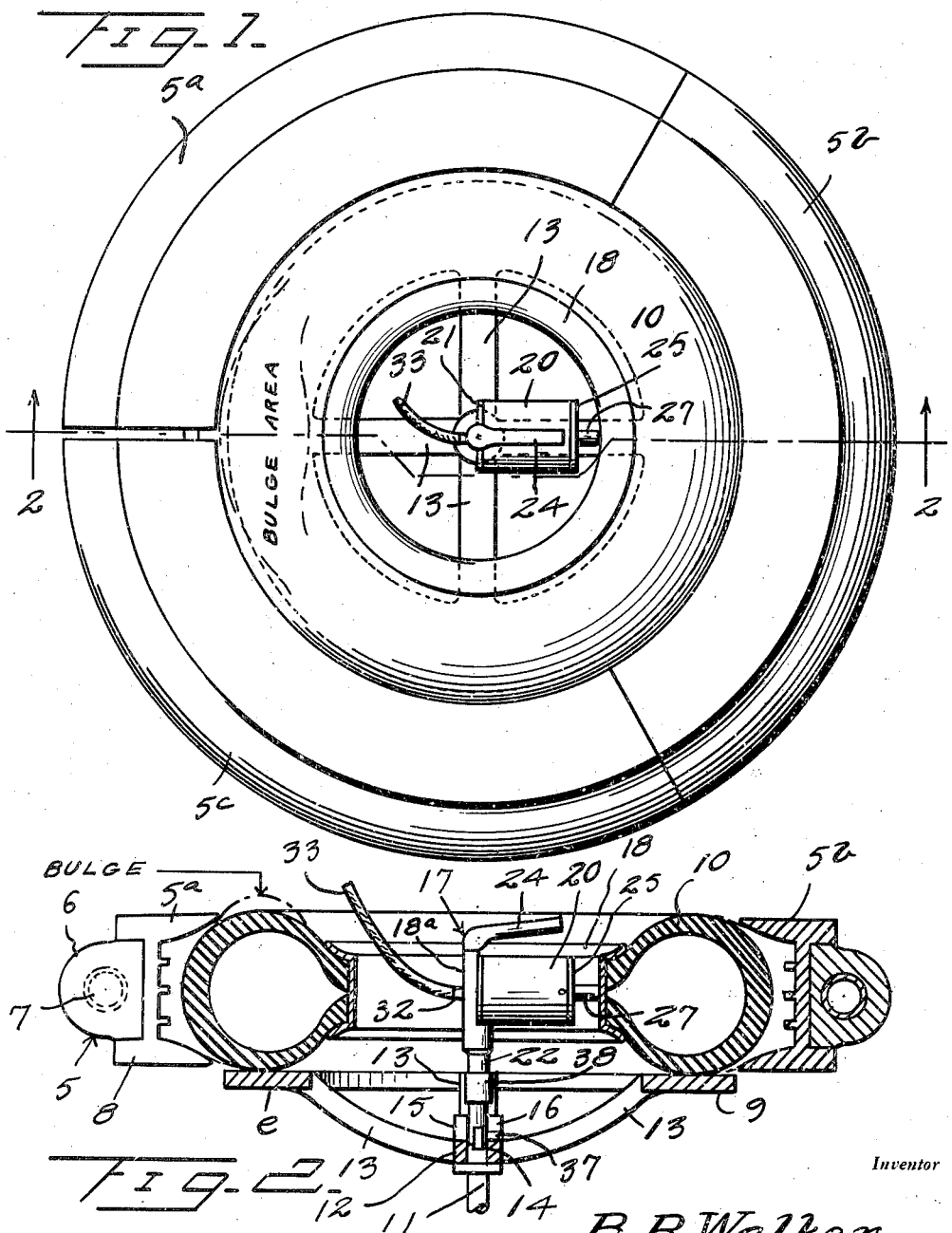

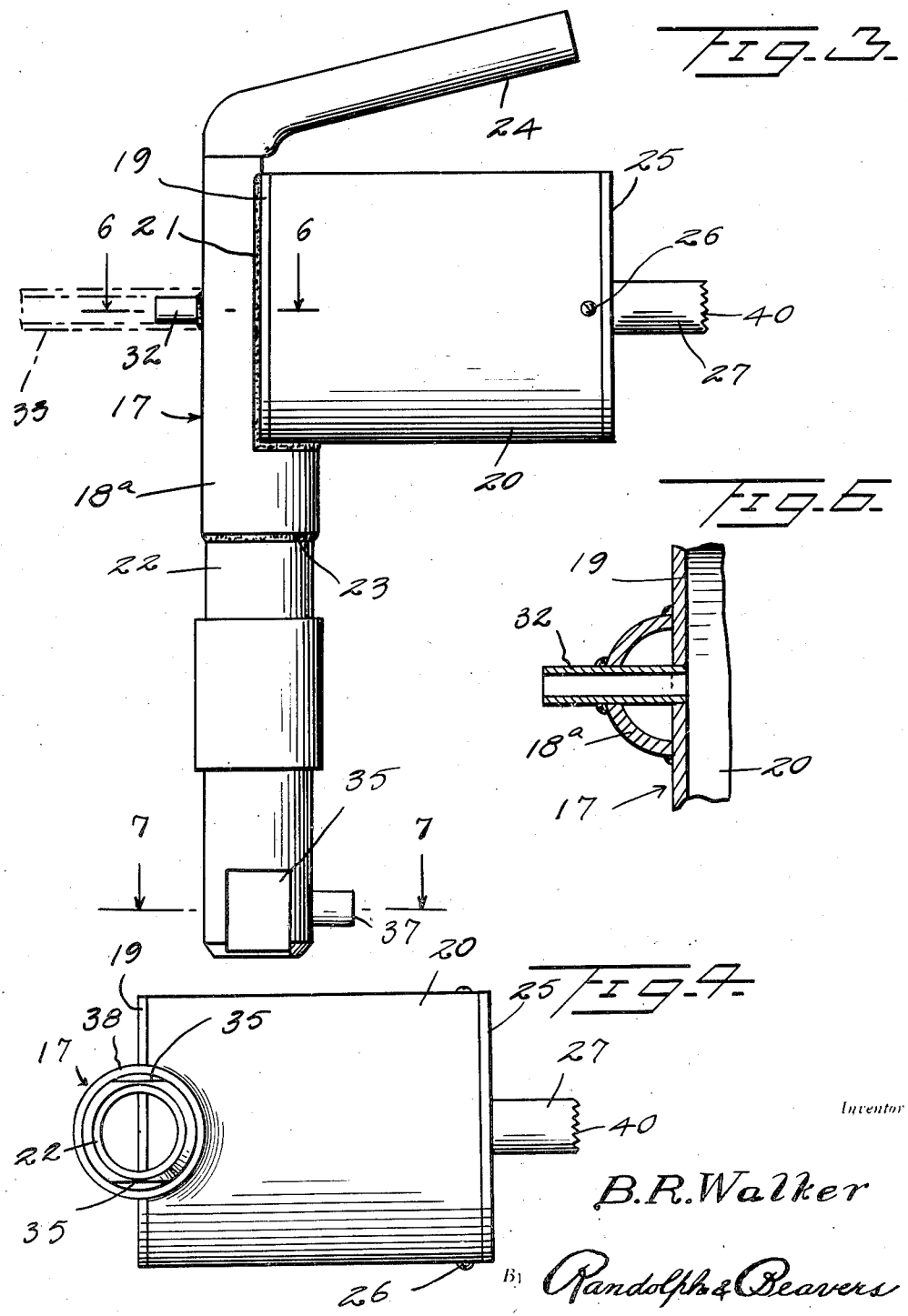

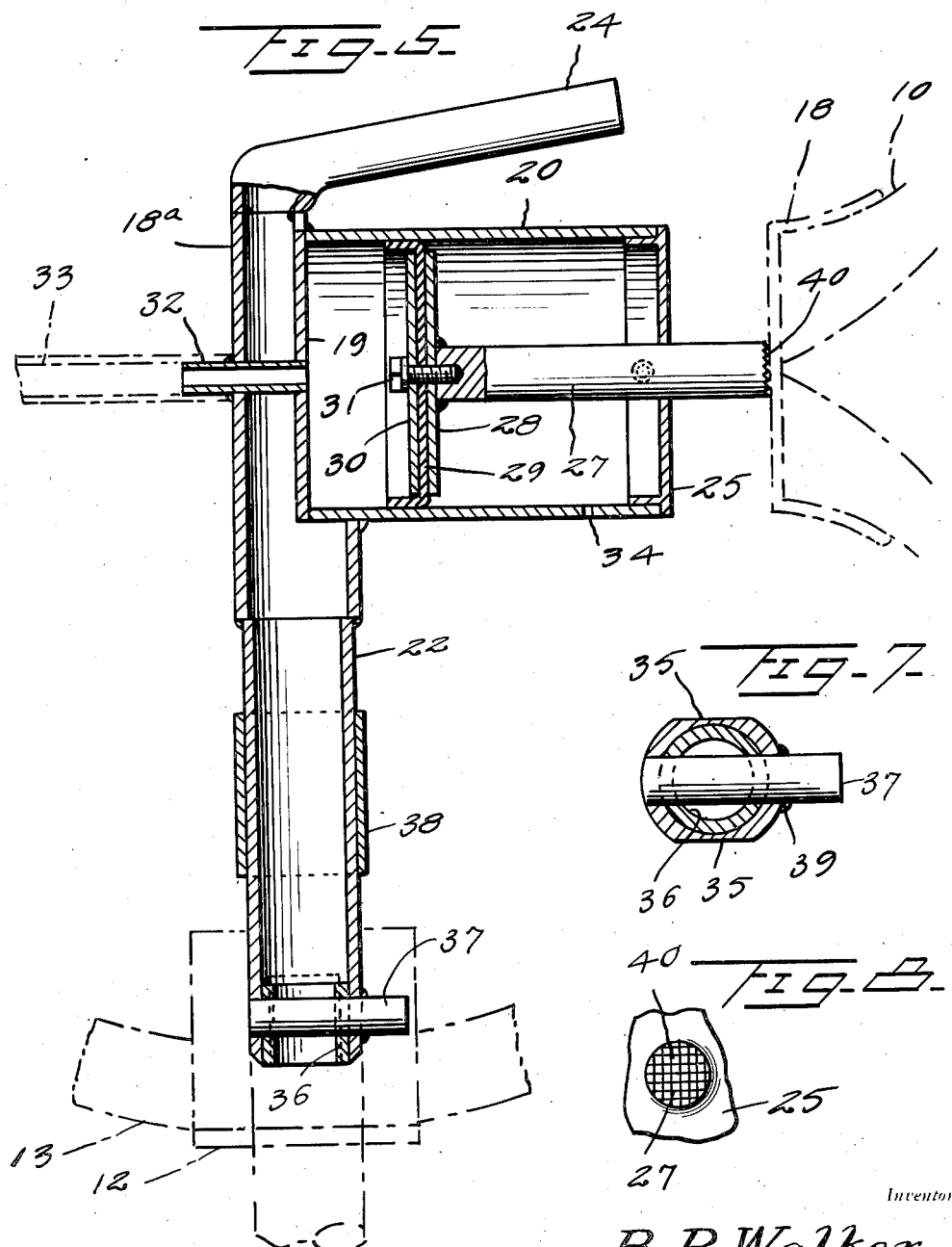

2,480,204

UNITED STATES PATENT OFFICE 2,480,204

TIRE JACK FOR RECAPPING MACHINES

Bill R. Walker, Berryville, Ark.

Application September 27, 1946, Serial No. 699,736

3 Claims. (Cl. 18—18)

This invention relates to recapping machines and adjuncts therefore, the invention more particularly relating to means for facilitating the placement of the jaws of a recapping machine properly about a tire without pinching a portion of the tire between the ends of the jaws to be fastened together.

At present some difficulty is experienced in properly centering a tire within the sectional mold of recapping machines, because when the free ends of the sections are brought together to encase the tread portion of the tire, there is a tendency of the tire to compress on the far side and to bulge considerably at a point where the free ends of the mold sections are to be brought together. Heretofore manual devices have been employed to exert force on the tire in the opposite direction from the bulge, so as to reduce the bulged area of the tire and permit the mold sections to be brought together and fastened without pinching any of the material of the tire.

The principal object of the present invention is to provide a pneumatic device which can be readily installed in order to effect force on the tire in a direction away from the bulge, in a manner more quickly and efficiently than means so far designed and employed are capable of accomplishing.

Another object of the invention is to provide a jack of the character stated constructed for use with compressed air and with a view toward maintaining the cost of manufacture and upkeep at a minimum.

Still another object of the invention is to provide a pneumatic jack of the character stated which can be readily installed in a recapping machine in proper relation with respect to a tire and operated quickly and positively with practically no utilization of manual effort.

A further object of the invention is to provide a jack for use in conjunction with recapping machines which has only one moving part.

Still a further object of the invention is to provide a tire deforming jack for recapping machines which will not require any modifications of the conventional recapping machine, the device employing certain standard construction of such machines for the purpose of anchorage and stability.

Still a further important object is to provide a dependable device of the character stated which will not only be substantially foolproof in all respects, but durable and not susceptible to the ready development of defects, this being due especially to the small number of parts that go to make up the entire device.

These and various other objects and advantages of the invention will become apparent to the reader of the following description.

In the drawings:

Figure 1 is a top plan view of the device shown in operating relation with respect to a tire located within a recapping mold.

Figure 2 is a section taken substantially on line 2—2 of Figure 1.

Figure 3 is a side elevational view of the device apart from a tire.

Figure 4 is a bottom plan view of the structure as shown in Figure 3.

Figure 5 is a vertical sectional view through the device.

Figure 6 is a fragmentary sectional view taken substantially on line 6—6 of Figure 3.

Figure 7 is a section taken on line 7—7 of Figure 3.

Figure 8 is a fragmentary side elevational view of the head of the cylinder showing the knurled plunger.

Referring to the drawings, numeral 5 generally refers to a mold which is divided into sections 5a, 5b and 5c (see Figure 1), these sections being made up of a steel mold body 6 having a steam cavity 7 and located on an aluminum matrix 8.

The standard recapping machine has a top plate (not shown) and a lower plate 9.

The lower plate consists of an annulus e upon which a tire to be recapped and denoted by numeral 10, is supported, the lower plate 9 being supported by a hydraulic jack or the like 11 (only partly shown). The plate 9 has a spider made up of a hub 12 and upwardly curved arms 13 secured to or merging with the annulus e. In most types of recapping machines of this type, the hub 12 has an opening 14 downwardly therethrough, the hub at its upper portion having oppositely directed slots or notches 15, 16 for selectively receiving a pin or lateral lug on the lower end of a shaft which supports a the usual upper plate (not shown) and this construction of the hub 12 is utilized, when employing the improved jack structure, making up the present invention and which is generally referred to by numeral 17.

Figure 2 shows that the tire 10 has its rim 18 and that the jack 17 has its movable element engaging the rim, or in a position to engage the rim, while being supported by the hub 12. Following a description of the jack 17, a description of the operation of the same will be given.

The jack 17 includes in construction a barrel 18a which is cut away for substantially three-fourths of its length to provide an inset for receiving the closed inner end 19 of a cylinder 20, the edges of the barrel 18a at this cut away portion, being welded as at 21 to the end wall 19 of the cylinder 20. A tube of less diameter and denoted by numeral 22, has one end welded as at 23 to one end of the barrel 18, while an obliquely disposed handle 24 projects from the other and reduced end of the barrel 18a in a direction adjacent to, but diverged with respect to the cylinder 20.

The outer end of the cylinder 20 has a removable end wall or head 25, this head having a skirt portion disposed into the adjacent end of the cylinder 20 and secured by set screws 26. Suitable leakproof means may be employed in conjunction with the head 25. An elongated plunger 27 extends through a central opening of the head 25 and is welded or otherwise secured to a plate 28. A packing cup 29 is interposed between the plate 28 and a second plate 30 and a bolt 31 is disposed through openings in the plates and packing cup 29 and is adapted to be screwed into a threaded recess in the adjacent end of the plunger 27 for holding the thus formed piston in assembled position as shown in Figure 5.

Extending from an opening in the end wall 19 of the cylinder 20 is a small tube 32, which projects through another opening in the barrel 18a. The outer end of the tube 32 defines a nipple, over which a compressed air tube or conduit 33 is located and to the end that compressed air can flow to the cylinder 20.

The cylinder 20, adjacent the head 25 has a safety pressure vent 34 so as to allow for the escape of compressed air in the cylinder, when the piston moves to its fully extended position. The free end of the tube 22 has opposite side portions flattened as at 35 and to reinforce this end of the tube, a bushing 36 is disposed into the tube, this bushing having diametrically opposite openings which register with diametrically opposite openings in the tube 22, to receive a pin 37, one end of which projects beyond a side portion of the tube 22, to engage into one of the notches 15, 16 of the lower plate spider hub 12. (See Figure 2.)

Some types of recapping machines have hubs 12 with larger openings 14 and in such instances, a sleeve 38 on the tube 22 can be slipped down to serve as a shim in the opening 14. It is preferable that the pin 37 be welded as at 39 to the tube 22.

Suitable packing means may be provided between the cylinder head 25 and the plunger 27 and it is preferable that the outer end of the plunger be milled or toothed as at 40 to prevent slippage on the inside of the rim 18.

In the operation of this jack, let it be assumed, that the tire 10 has first been positioned on the lower plate 9. Without the jack 17, when the sections 5a, 5b and 5c are brought to encompassed position around the tire and an effort is made to close the free ends of the sections 5a, 5c, these ends of the sections will pinch the tire, due to the fact that a bulged area has occurred at this portion of the tire, due to the compressing effect of the mold throughout the remaining major portion of the tire.

The purpose of the jack 17 is to exert force against the tire 10 at a point substantially opposite the bulged area, shown in Figure 1. To accomplish this, the jack 17 is lifted from the floor or a rack, by the handle 24 and lowered down through the rim 18 with the lower end of the tube 22 dropping into the opening 14 of the spider 12, which is part of the lower plate 9 of the recapping machine. The jack is lowered so that the pin 37 will drop in the slot 16, which will properly position the jack with the gripping end 40 of the plunger 27 opposed to a point on the rim 18 opposite the bulged area of the tire, which bulged area will always occur just about opposite the medial point of the intermediate section 5b, and at this point pressure is to be exerted by the jack 17.

By advancing compressed air to the cylinder 20 by way of the conduit 33 and nipple 32, to exert pressure against the piston therein, the plunger 27 will be forced against the rim 18 and will compress the adjacent portion of the tire 10, thus relieving the opposite portion of the tire, to the end that the bulged area will disappear and the free ends of the sections 5a, 5c can be easily closed and fastened. After this operation, air is relieved from the cylinder 20 and the jack 17 removed, after which the usual upper plate (not shown) is lowered onto the tire.

It is obvious, that the jack can be manufactured inexpensively, inasmuch as almost the entire structure is manufactured from tubular material and there is only one moving part, namely the piston-plunger unit. Further, the utilization of the jack 17 does not call upon the necessity of modifying in any way, the conventional recapping machine.

While the foregoing description sets forth the invention in specific terms, it is to be understood that numerous changes in the shape, size and materials may be resorted to without departing from the spirit and scope of the invention as claimed hereinafter.

Having described the invention, what is claimed as new is:

1. The combination with a recapping machine including a transversely split mold and a rim and further including a stationary vertical standard axially disposed within the mold and a pneumatic jack; said jack comprising a cylinder provided with a horizontally movable piston therein and fluid pressure inlet and outlet for the cylinder, an adapter projecting from the cylinder and connectable with the standard and supporting the cylinder in horizontal position, said piston provided with an elongated plunger projecting externally of the cylinder and adapted to engage the rim tire being recapped at a point diametrically opposite from the split of the surrounding mold.

2. The combination with a recapping machine including a transversely split mold and a rim and further including a stationary vertical standard axially disposed within the mold and a pneumatic jack; said jack comprising a cylinder provided with a horizontally movable piston therein and fluid pressure inlet and outlet for the cylinder, an adapter projecting from the cylinder and connectable with the standard and supporting the cylinder in horizontal position, said piston provided with an elongated plunger projecting externally of the cylinder and adapted to engage the rim tire being recapped at a point diametrically opposite from the split of the surrounding mold, said adapter being disposed at a right angle to the cylinder and provided with a cross pin engageable in said standard.

3. The combination with a recapping machine including a transversely split mold and a rim and further including a stationary vertical standard axially disposed within the mold and a pneumatic jack; said jack comprising a cylinder provided with a horizontally movable piston therein and fluid pressure inlet and outlet for the cylinder, an adapter projecting from the cylinder and connectable with the standard or supporting the cylinder in horizontal position said piston provided with an elongated plunger projecting externally of the cylinder and adapted to engage the rim tire being recapped at a point diametrically opposite from the split of the surrounding mold, said adapter being in the form of an elongated tube extending at right angles to the cylinder and along one end thereof and provided with an outwardly projecting handle at one end and standard engageable means at its other end.

BILL R. WALKER.

REFERENCES CITED

The following references are of record in the file of this patent:

UNITED STATES PATENTS

| Number | Name | Date |
| --- | --- | --- |
| 687,289 | Thornton | Nov. 26, 1901 |
| 870,178 | Johnson | Nov. 5, 1907 |
| 1,849,078 | Eckroate | Nov. 15, 1932 |
| 1,942,368 | Wilkoff | Jan. 2, 1934 |
| 2,345,172 | Bacon | Mar. 28, 1944 |
| 2,372,644 | Bacon | Apr. 3, 1945 |